United States Patent Office 2,990,428
Patented June 27, 1961

2,990,428
TERTIARY-BUTYL SUBSTITUTED PARA-PHENYLPHENOLS
Robert William Gunn Preston, Norton-on-Tees, England, assignor to Imperial Chemical Industries Limited, London, England, a corporation of Great Britain
No Drawing. Filed Feb. 24, 1958, Ser. No. 716,893
Claims priority, application Great Britain Mar. 1, 1957
5 Claims. (Cl. 260—620)

This invention relates to new chemical compounds.
According to the invention there are provided new tertiary-butyl substituted para-phenylphenols which are 2-tertiarybutyl-para phenylphenol, 2:4'-ditertiarybutyl-para-phenylphenol and 2:6:4'-tritertiarybutyl-para-phenylphenol.

These new chemical compounds may be represented by the general formula:

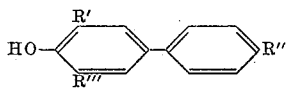

where R' is a tertiary butyl group, R" is hydrogen or a tertiary butyl group and R''' is hydrogen or a tertiary butyl group when R" is also a tertiary butyl group.

The new compounds of the invention are of considerable value as antioxidants for compounds which are liable to deterioration arising from peroxide formation, in particular for fats, fatty oils and soaps.

It is therefore a further feature of the invention to provide a new composition of matter comprising a compound liable to deterioration arising from peroxide formation such as a fat, fatty oil or soap and a small amount of a tertiary butylated para-phenylphenol as described above.

The amount of the tertiary butylated phenol employed will depend on the compound to be stabilised and the conditions to which it is to be exposed. Suitable amounts are up to 2 percent by weight, preferably 0.001 to 1 percent by weight of the compound to be stabilised.

In general the new compounds of the invention are produced by bringing a gas containing isobutene into contact with a solution of para-phenylphenol in a suitable solvent in the presence of an alkylation catalyst such as for example, sulphuric acid, phosphoric acid and Friedel-Craft type catalysts such as boron trifluoride, aluminium chloride and zinc chloride. It is preferred to use sulphuric acid as the alkylation catalyst.

The amount of isobutene absorbed by the para-phenylphenol is regulated to give the best yield of the desired tertiary-butylated para-phenylphenol and the mixture of butylation products and any unchanged para-phenylphenol then separated by known methods. For example, the unchanged para-phenylphenol may be extracted with aqueous caustic alkali and the residue fractionally distilled to obtain the desired tertiary butylated para-phenylphenol.

It is a particular feature of the invention to prepare the new chemical compounds by bringing a gas containing isobutene into contact with para-phenylphenol in solution in a second phenol, and in the presence of an alkylation catalyst, preferably sulphuric acid.

Preferably the solvent phenol should not undergo butylation under the reaction conditions in order to facilitate separation of the desired butylated phenols from the reaction product.

For the production of the di- and tri-substituted paraphenyl phenols the solvent phenol should be one which leads to the formation of 2:4'-di-tertiarybutyl-para-phenylphenol in preference to 2:6-di-tertiarybuyl-para-phenylphenol.

It is preferred that the solvent phenol is 3:5-dimethyl phenol.

2:4'-ditertiarybutyl-para-phenylphenol may also be conveniently prepared by treating molten 2-tertiarybutyl-para-phenylphenol with isobutene in the presence of an alkylation catalyst such as sulphuric acid. 2:6:4'-tritertiarybutyl-para-phenylphenol may likewise be prepared using molten 2-tertiarybutyl-para-phenylphenol, 2:4'-ditertiarybutyl-para-phenylphenol or 2:6-ditertiarybutyl-para-phenylphenol.

The temperature at which the butylation is carried out may suitably be up to 150° C.

The new chemical compounds of the invention have the following properties:

2-tertiarybutyl-para-phenylphenol, melting point 40–42° C., boiling point 189–190° C. under a pressure of 6 mm. Hg.

2:4' - ditertiarybutyl - para - phenylphenol, melting point 120–122° C., boiling point 221–226° C. under a pressure of 5 mm. Hg.

2:6:4'-tritertiarybutyl-para-phenylphenol, melting point 134° C.

Example 1

170 grams para-phenyl phenol were dissolved in 750 grams 3:5-dimethyl phenol, 17 grams 20% oleum added, and iso-butene passed into the well-stirred mixture maintained at a temperature of 80° C. until the weight of the reaction mass had increased by 130 grams. The reaction mass was then dissolved in 500 mls. benzene and the solution washed several times with 10% w./v. aqueous caustic soda solution and finally with water, the benzene and aqueous solutions being separated after each washing. The resulting washed benzene solution was dried and fractionally distilled at atmospheric pressure to remove benzene. The distillation residue was then fractionally distilled under a pressure of 6 mm. Hg absolute and a fraction collected over the temperature range 189° to 190° C. which consisted of substantially pure 2-tertiarybutyl-para-phenylphenol. This product melted at 40° to 42° C. and gave an ultimate analysis C=85.4%, H=8.0% compared with a theoretical composition of C=85.0%, H=8.0% for 2-tertiarybutyl-para-phenylphenol $C_{16}H_{18}O$. The structure of the product was further confirmed by infra-red spectrophotometry and by debutylation to para-phenylphenol. The yield of substantially pure 2-tertiarybutyl-para-phenylphenol was 53% of the theoretical yield based on the paraphenylphenol introduced.

By acidifying the aqueous caustic soda wash liquor substantially all of the 3:5-dimethylphenol was recovered unchanged.

Example 2

170 grams para-phenylphenol were dissolved in 750 grams 3:5-dimethylphenol, 17 grams 20% oleum added, and iso-butene passed into the well-stirred mixture maintained at a temperature of 80° C. until the weight of the reaction mass had increased by 129 grams. The reaction mass was then dissolved in 900 mls. benzene and the solution was washed with 1 litre 5% wt./vol. sodium carbonate solution to which 50 mls. methanol had been added. The benzene solution was further washed with water and then dried. After addition of 10 mls. 10% wt./vol. methanolic caustic potash the benzene was removed by fractional distillation at atmospheric pressure. Fractional distillation of 971 grams of the residue yielded 660 grams of unchanged 3:5-dimethylphenol boiling at 114° to 117° C./20 mm. and 121 grams of substantially pure 2-tertiarybutyl-para-phenylphenol boiling at 185° to 190° C./6 mm.

Example 3

The procedure described in Example 1 was repeated except that the isobutene was passed into the mixture until the weight of the reaction mass had increased by 237 grams. The reaction product was dissolved in benzene, and washed as described in Example 1. Fractional distillation of the washed, dried benzene solution under an absolute pressure of 5 mm. Hg yielded 92 grams 2-tertiarybutyl-para-phenylphenol boiling at 189° to 197° C. and 69 grams 2:4'-di-tertiarybutyl-para-phenylphenol boiling at 221° to 226° C. The yields of 2-tertiarybutyl-para-phenylphenol and 2:4'-di-tertiarybutyl-para-phenylphenol based on the para-phenylphenol introduced were 40% and 25% respectively of the theoretical yield.

Crystallisation of the 2:4'-di-tertiarybutyl-para-phenylphenol from 60° to 80° C. petroleum ether yielded small colourless prisms melting point 120° to 122° C. and having an ultimate analysis C=85.3%, H=9.3% (2:4'-di-tertiarybutyl-para-phenylphenol $C_{20}H_{26}O$ contains C= 85.1%, H=9.2%).

Example 4

113 gms. of 2-tertiary-butyl-para-phenylphenol were heated to 120° C. and 5.7 g. of 20% oleum added. Isobutene gas was passed into the well stirred mixture maintained at 120° C. until 120 gms. of the gas were absorbed. The reaction mass was then dissolved in 200 mls. of benzene and the resulting solution washed with 200 mls. of 5% caustic soda solution. The benzene solution was further washed with water until the washings were neutral and the solution then evaporated to remove the water and benzene. 208 grams of a mixture of crude butylated phenols were thus obtained.

The mixture contained 81 gms. of 2:4'-di-tertiary-butyl-para-phenylphenol and 65 gms. of 2:6:4'-tri-tertiary-butyl-para-phenyl phenol. This latter product melted at 134° C. and gave an ultimate analysis of C=85.1%, H=10.2% compared with a theoretical composition of C=85.2%, H=10.1%.

I claim:

1. A process for the production of a tertiary-butyl substituted para-phenylphenol selected from the group consisting of 2:4'-di-tertiarybutyl-para-phenylphenol and 2:4':6-tri-tertiarybutyl-para-phenylphenol in which a gas consisting essentially of isobutene is brought into contact with a solution of para-phenylphenol in 3:5-dimethylphenol in the presence of an alkylation catalyst.
2. A process as claimed in claim 1 in which the alkylation catalyst is sulphuric acid.
3. A process as claimed in claim 1 in which temperatures of up to 150° C. are employed.
4. 2:4'-ditertiarybutyl-para-phenylphenol.
5. 2:4':6-tritertiarybutyl-para-phenylphenol.

References Cited in the file of this patent
UNITED STATES PATENTS

| | | |
|---|---|---|
| 2,181,823 | Stevens | Nov. 28, 1939 |
| 2,189,805 | Kyrides | Feb. 13, 1940 |
| 2,248,827 | Stevens et al. | July 8, 1941 |
| 2,655,547 | Bryner | Oct. 13, 1953 |
| 2,726,270 | Bryner | Dec. 6, 1955 |
| 2,831,898 | Ecke et al. | Apr. 22, 1958 |